United States Patent [19]

Mitsuo et al.

[11] 4,136,607
[45] Jan. 30, 1979

[54] TOASTER WITH BI-METAL CONTROLS

[75] Inventors: Masaru Mitsuo, Minoo; Sigeharu Isayama, Osaka, both of Japan

[73] Assignees: Toyo Press Co., Ltd.; Matsushita Electric Industrial Co., Ltd., both of Osaka, Japan

[21] Appl. No.: 822,644

[22] Filed: Aug. 8, 1977

[30] Foreign Application Priority Data

Oct. 5, 1976 [JP] Japan .................................. 51-120099
Oct. 5, 1976 [JP] Japan .................................. 51-120100

[51] Int. Cl.² ............................................. A47J 37/08
[52] U.S. Cl. ..................................... 99/329 R; 99/337
[58] Field of Search ................... 99/329 R, 325, 326, 99/328, 329 RT, 331, 333, 337, 338

[56] References Cited

U.S. PATENT DOCUMENTS

| 2,042,595 | 6/1936 | Graham | 99/326 |
| 2,099,210 | 11/1937 | Ireland | 99/329 R |
| 2,693,141 | 11/1954 | Johnson et al. | 99/326 |
| 2,861,513 | 11/1958 | Weeks | 99/331 |
| 2,901,965 | 9/1959 | Chivers | 99/326 X |
| 3,350,997 | 11/1967 | Kimura et al. | 99/329 R |
| 3,418,917 | 12/1968 | Sato | 99/329 R |

Primary Examiner—Harvey C. Hornsby
Assistant Examiner—Arthur O. Henderson
Attorney, Agent, or Firm—Stevens, Davis, Miller & Mosher

[57] ABSTRACT

This invention relates to a toaster in which the toasting of a slice of bread is controlled by displacement of a bi-metal element disposed between a heater and the bread, the bi-metal element being displaced by a bread supporter moved in co-operation with a temperature control means. An operating lever is provided for moving a vertically movable means which cooperates with a hook lever for holding the vertically movable means in a bread toasting position. The operating and hook levers are coaxially provided so as to be normally operated together.

10 Claims, 7 Drawing Figures

TOASTER WITH BI-METAL CONTROLS

This invention relates to a toaster adapted to control the toasting of a slice of bread by displacement of a bi-metal disposed element between the bread and a heater, such as an electric heater, and has for its first object to provide an arrangement in which a bread supporter is horizontally moved in co-operation with a temperature control means and the displacement of the bi-metal element is caused by the bread supporter thereby achieving a simplification in construction of the temperature control means and a decrease in the reset time.

A second object of the present invention is to provide a toaster in which an operating lever for moving a vertically moving means and a hook lever for holding the vertically movable means in a bread toasting position are co-axially disposed to be normally operated together with each other, thereby achieving a reduction in the number of parts used, a simplified construction and a unitary arrangement of the hooking mechanism and the vertically movable means.

A conventional toaster of this kind is arranged such that, as shown in FIG. 7, displacement of a bi-metal element 1a is transmitted through a connecting rod 2a to a distorting plate 3a a hook lever 4a is operated by the distortion of the plate 3a to unlock a vertically movable means 5a such that a bread supporter (not shown) interlocking with the means 5a can be upwardly moved under the action of a spring 6a from a toasting position to a non-toasting position while the electric heater is de-energized. In this case, the bi-metal element 1a is secured at its upper end to an upper plate of a body of the toaster and at its lower end to a bi-metal supporting member 8a connected to an adjusting frame 7a which is slidably disposed between side plates of the body, and an adjusting knob 9a is operated to cause rotation of a cam 10a to slide the adjusting frame 7a thereby adjusting the position of the bi-metal element supporting member 8a to control the temperature. However, this arrangement has a disadvantage in that a relatively large number of parts, such as the adjusting frame 7a, a spring (not shown) for urging the adjusting frame and the cam 10a, are required for the temperature control mechanism resulting in a complicated and expensive construction. Moreover, a suitable space for the adjusting frame 7a must be provided below the bread toasting chamber and particularly below the bi-metal element 1a and therefore the rapid cooling of the toasting chamber after completion of a toasting operation is prevented thereby inhibiting any reduction in the toaster reset time.

Furthermore, the hook lever 4a is formed in generally U-shape to provide a plate-like portion for receiving the distorting force of the plate 3a and a hooking portion for engaging with the vertically movable means 5a, which is a very complicated construction. Further, the hook lever 4a is rotatably provided below the vertically movable means 5a so that the position at which the temperature control means is mounted is limited. There is a further disadvantage in that the operating lever 11a for causing the vertical movement of the means 5a is rotatably provided to be disengageable from the means 5a, but is provided separately from the hook lever 4a thus requiring a separate shaft and increasing the number of parts.

The objects of the present invention is to provide a toaster in which the disadvantages described above are removed.

Figure 1:
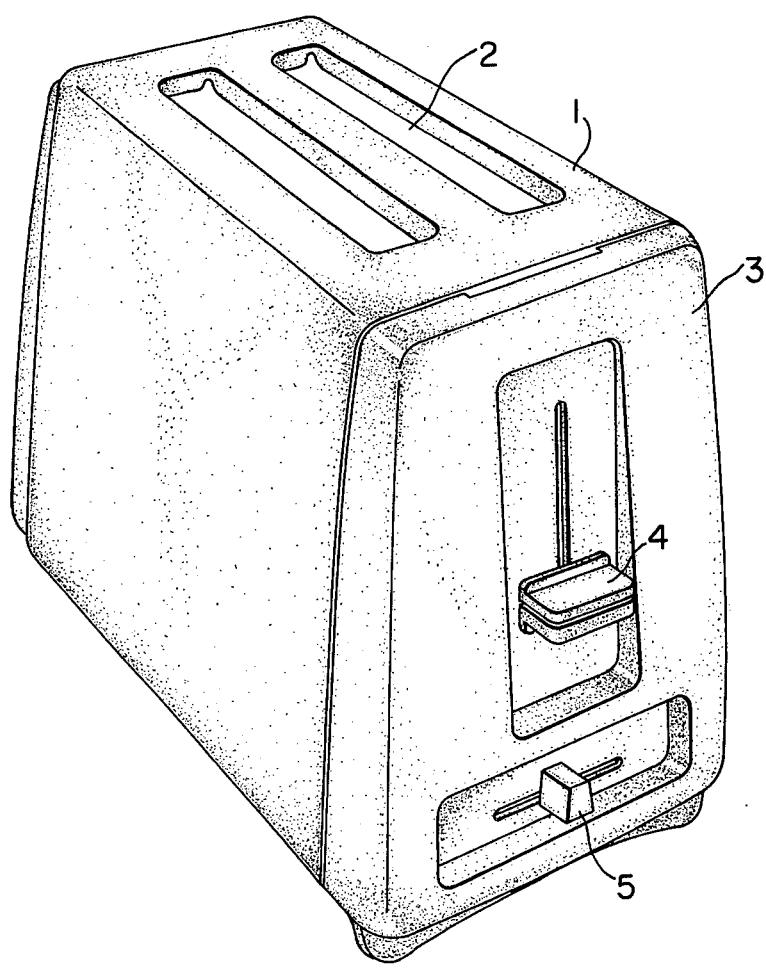
FIG. 1 is a perspective view of an embodiment of a toaster according to the present invention.
Figure 2:
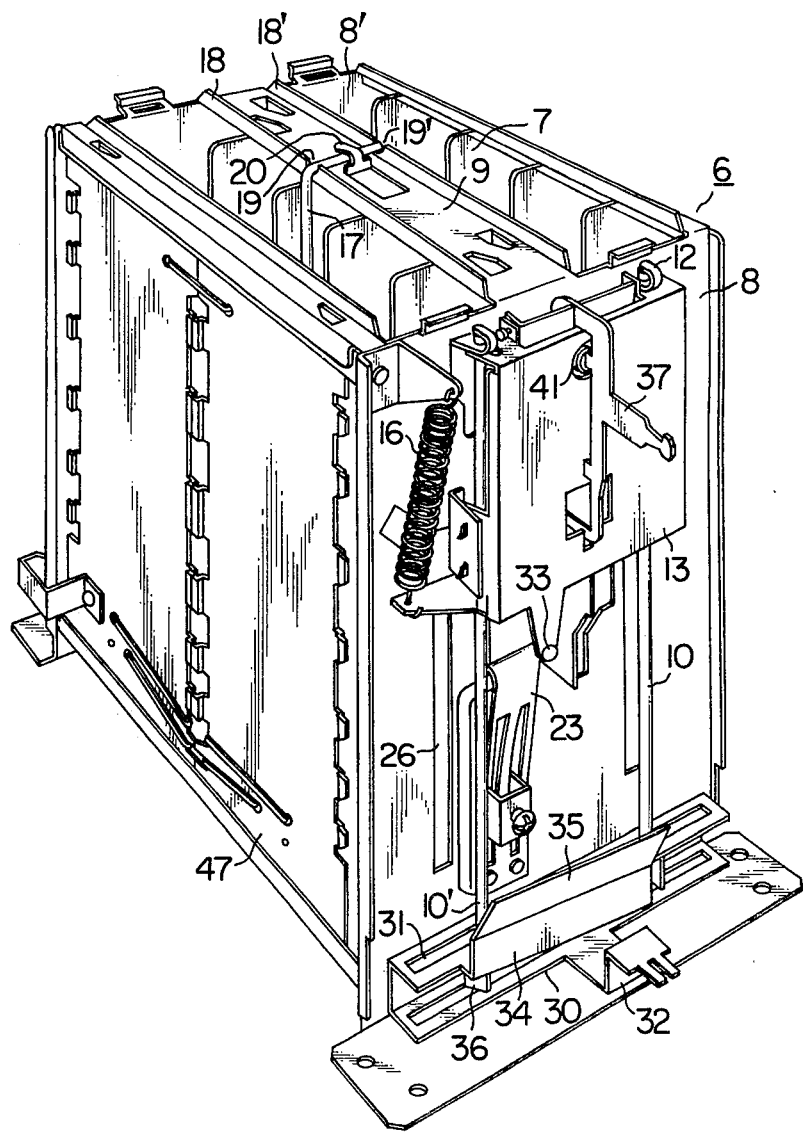
FIG. 2 is a perspective view of the toaster of FIG. 1 from which some parts are removed.

Referring first to FIG. 1, element 1 is an outer casing having a pair of bread inlet ports 2 at its upper portion, element 3 is a pair of outer side plates secured to opposite sides of the casing 1, element 4 is a vertically movable knob and element 5 is a temperature control knob which is horizontally movable.

Figure 3:
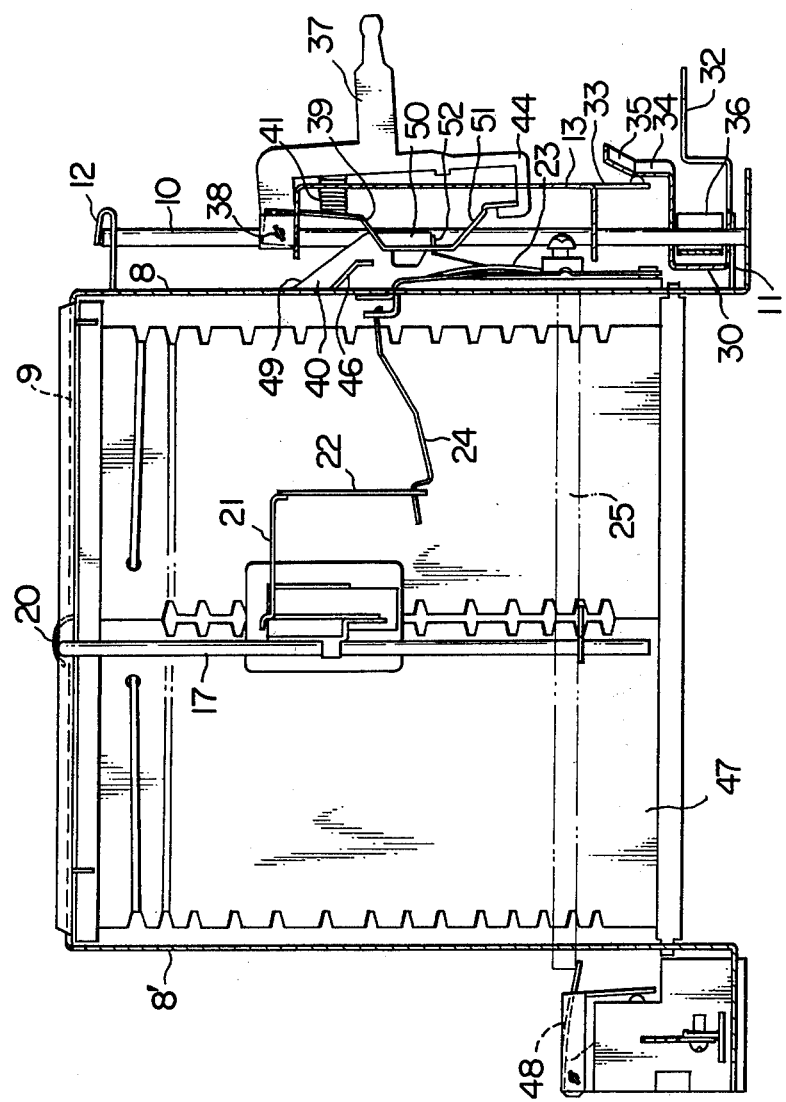
FIG. 3 is a side section of the toaster.
Figure 4:
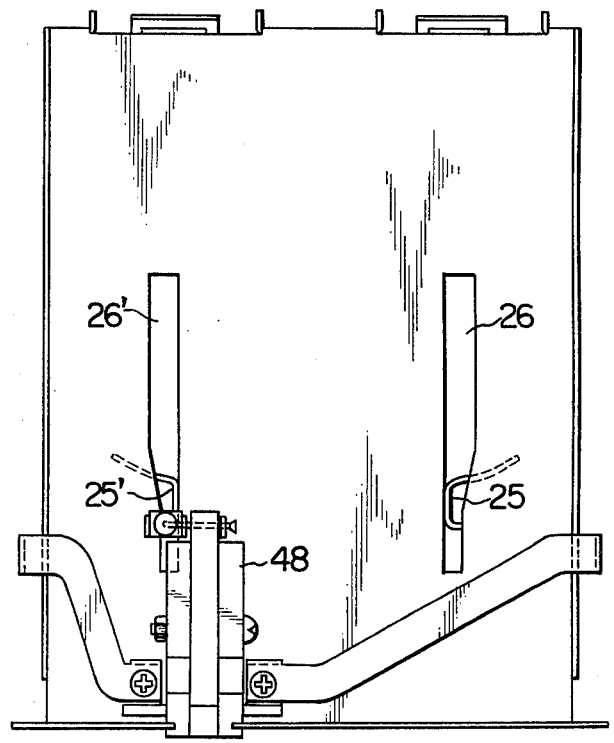
FIGS. 4 and 5 are side and bottom views, respectively, thereof.
Figure 5:
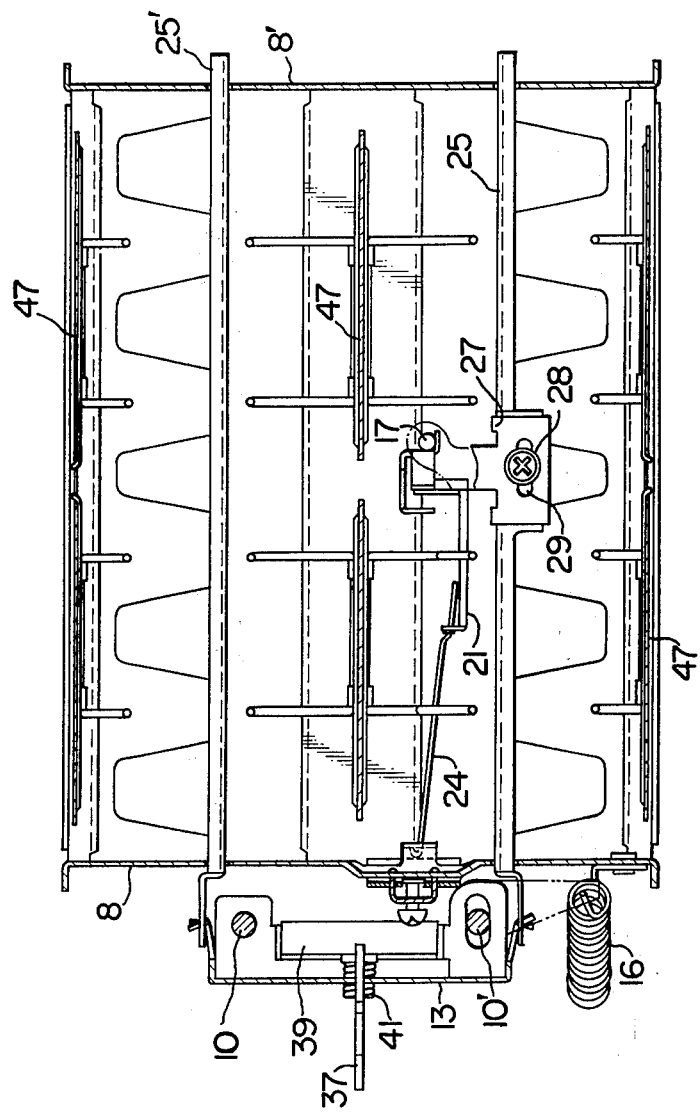
Figure 6:
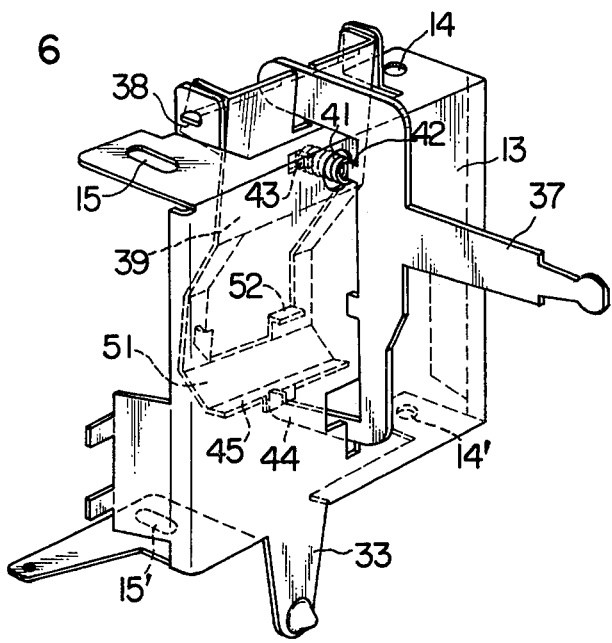
FIG. 6 is an enlarged perspective view of a portion of the toaster of FIG. 1.
Figure 7:
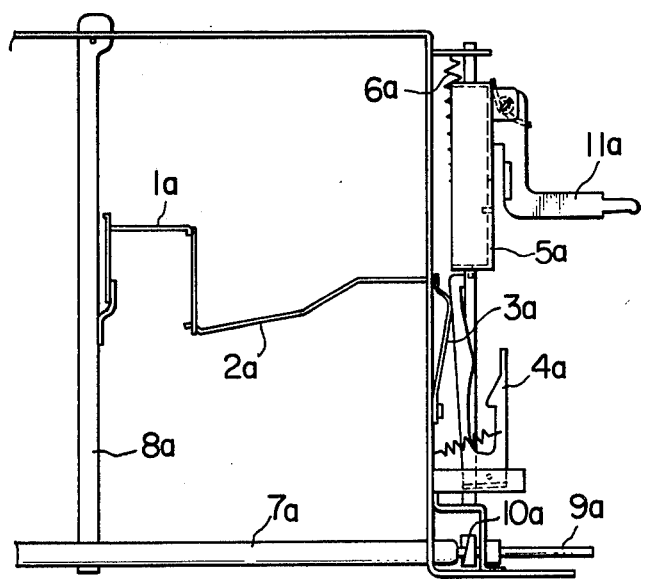
FIG. 7 is a section of a conventional toaster from which some parts are omitted for clarity.

FIGS. 2 to 6 show the toaster from which the casing 1 and the side plates 3 are removed. In the drawings, element 6 is a toaster body defining a bread toasting chamber 7 and provided with a pair of side plates 8, 8' and an upper plate 9 connecting the side plates 8, 8'. Elements 10, 10' are guide rods disposed along the side plate 8 and supported by lower and upper supporting projections 11 and 12 integrally formed on the side plate 8, and after assembly, the rods 10, 10' are secured by bending tongues of the upper supporting projections 12 into a U-shape. Element 13 is a vertically movable device for moving a slice of bread to the toasting position. The device 13 is provided with a pair of upper and lower circular holes 14, 14' associated with the guide rod 10 and a pair of slots 15, 15' associated with the guide rod 10' which are arranged to enable the device 13 to be moved vertically and also rotated horizontally by the force of a spring 16 around the guide rod 10 to the extent permitted by the slots 15, 15' upon manual operation and this movement is always caused outwardly due to the inclined disposition of the spring 16. Element 17 is a bi-metal element supporting member provided vertically about the center of the bread toasting chamber 7, and the member 17 is formed of a rod bent into an L-shape at its upper end portion the latter of which is engaged with grooves 19, 19' formed in upright walls 18, 18' of the upper plate 9 and held against upward movement by a tongue 20 integrally formed on the plate 9. Element 21 is a bi-metal element secured at its one end to the bi-metal element supporting member 17 and having a free end provided with an amplifying rod 22 extending downwardly to engage at its lower end with an end of a connecting rod 24 for transmitting the movement of the rod 22 to a distorting plate 23. Elements 25 and 25' are bread supporters interlocked with the vertically movable device 13 for vertical movement within the bread toasting chamber. Opposite ends of the bread supporters are engaged with guide slots 26, 26' formed in the side plate 8, 8' of the body 6. The guide slots 26, 26' to which the ends of the bread supporters 25, 25' are loosely fitted are formed such that, as shown in FIG. 4, the upper portions have a width relatively larger than that of the bread supporters 25, 25' and the lower portions of the guide slots have a width slightly larger than that of the bread supporters. A connecting plate 27 provided with a through hole fitted by the bi-metal element supporting member 17 is secured by a bolt 28 to the bread supporter 25 connected to the rotatable side of the device 13, and the plate 27 is formed with a slot 29 through which the bolt 28 extends, such that its securing position can be adjusted. Element 30 is a temperature control device positioned below the vertically movable device 13 and slidable in a direction normal to the movement of the bread supporter 25 along the guide rods 10, 10'. The device 30 is of a ]-shape of which the upper and lower portions are formed with slots 31 with which the guide rods 10, 10' are slidably engaged and the lower portion of the device 30 is integrally formed with a lever portion 32 to which the temperature control knob 5 is attached. Integrally formed on the upper portion of the temperature control device 30 is a control surface 34 which abuts against a projection 33 integrally formed on the vertically movable device 13 to define the angular position of the device 13 when the device 13 has downwardly moved to the bread toasting position. Also integrally formed on the upper end of the control surface 34 is a guide portion 35 for guiding the downward movement of the projection 33, and the control surface 34 and the guide portion 35 are inclined in the horizontal direction with respect to the line extending between the guide rods 10 and 10'. Element 36 is a leaf spring interposed between the rods 10 and 10', the spring 36 being normally abutting upon an inner surface of the temperature control device 30 to provide a predetermined amount of load to the sliding movement of the device 30. Element 37 is an operating lever to be attached with the knob 4, the lever being mounted on a shaft 38 provided on the device 13 so as to be rotatable within a predetermined range. Element 39 is a hook lever engageable with a hook receiving member 40 provided on the side plate 8, the hook lever being also rotatably mounted on the shaft 38 similar to the operating lever 37. Element 41 is a compression spring interposed between a projection 42 on the operating lever 37 and a projection 43 on the hook lever 39 to serve to engage a latch 44 formed on a lower end of the lever 37 with an anchor 45 provided on a lower end of the lever 39, so that the operting and hook levers 37 and 39 can normally be rotated together with each other. Element 46 is a stop for defining the distorting position of the distorting plate 23, element 47 is an electric heater, and element 48 is a switch unit operated by an end of bread supporter 25. Furthermore, the hook receiving member 40 is formed by cutting and bending a portion of the side plate 8 to provide an arcuate oblique surface 49 and an anchoring step portion 50 provided at the end of the oblique surface 49. On the other hand, the hook lever 39 is integrally provided with an oblique surface 51 slidably engageable with the oblique surface 49 of the hook receiving member 40, and with an anchor 52 positioned above the oblique surface 51 to engage with the step portion 50.

With the arrangement described above, when it is intended to toast a slice of bread, the operating lever 37 is first operated to cause the downward movement of the vertically movable device 13 to engage the hook lever 39 with the hook receiving member 40 as shown in FIG. 3 so that the device 13 and the bread supporters 25, 25' interlocked therewith are set in the bread toasting position. When the operating lever 37 is pushed, the hook lever 39 is rotated under the action of the compression spring 41 in the clockwise direction together with the operating lever 37, and thereafter as the device 13 moves downwards, the oblique surface 51 of the hook lever 39 abuts against the oblique surface 49 of the hook receiving member 40 and only the hook lever 39 is rotated in the counter-clockwise direction against the action of the compression spring 41. As the hook lever 39 is further moved downwardly to pass over the oblique surface 49, the hook lever is again rotated in the clockwise direction under the action of the compression spring 41 to ensure that the anchor 52 provided on the hook lever 39 is engaged with the step portion of the hook receiving member 40 and thus the vertically movable device 13 and the bread supporters 25, 25' connected to the device 13 are set in the bread toasting position. As a result, the switch unit 48 is closed to commence the energization of the heater 47. When the toasting of the bread continues to attain a predetermined temperature, the displacement of the bi-metal element 21 is transmitted through the rods 22 and 24 to the distorting plate 23 which is, in turn, distorted to rotate the hook lever 39. Consequently, the hook lever 39 is disengaged from the hook receiving member 40 such that the device 13 and the bread supporters 25, 25' are upwardly moved under the action of the spring 16 to the non-toasting position, and thus the toasting of the bread is completed.

When it is desired to control the temperature, the bread supporter 25 is slid to displace the bi-metal supporting member 17 around the upper end thereby displacing the bi-metal element 21 to vary the distance between the rod 24 and the plate 23. In this case, the member 17 is rotated about the grooves 19, 19' of the walls 18, 18' of the plate 9 so that smooth rotation of the member without play can be achieved. Furthermore, since the bread supporter 25 is connected to the rotatable side of the vertically movable device 13, the supporter 25 is displaced in accordance with the angular position of the device 13 determined by the position of the temperature control device 30. In other words, the device 13 is outwardly urged by the spring 16 and the projection 33 is contacted with the control surface 34 of the temperature control device 30, and thus by varying the position of the contact of the projection 33 with the surface 34 the angular position of the device 13 is varied to displace the bi-metal element 21 through the bread supporter 25 and the bi-metal supporting member 17. In this case, since the control surface 34 of the temperature control device 30 is inclined with respect to the line extending across the guide rods 10, 10', the position of the contact between the projection 33 and the surface 34 is varied by operating the temperature control knob 5 to slide the surface 34.

When it is desired during the bread toasting process to manually return the vertically movable device 13 and the bread supporters 25, 25' to the non-toasting position, the operating lever 37 is rotated in the counter-clockwise direction, and since the anchor 45 of the hook lever 39 is engaged under the action of the spring 41 with the latch 44 of the operating lever 37, the hook lever 39 is also rotated in the counter-clockwise direction to disengage the anchor 52 of the hook lever 39 from the step portion 50 of the hook receiving member 40 thereby upwardly moving the device 13 and bread supporters 25, 25' to the non-toasting position under the action of the spring 16.

It will be appreciated from the foregoing description that the present invention brings forth the effects that since a portion of the bread supporter connected to the vertically movable device supports the lower portion of the bi-metal supporting member and the horizontal rotation of the vertically movable device displaces the bi-metal supporting member in the direction of displacement of the bi-metal element, there is no need to provide special parts for the temperature control, such as a control frame, used in a conventional toaster, and that the construction is simple and inexpensive. It is further advantageous that the portion below the bread toasting chamber is hollow and thus effective cooling convection is caused after the bread toasting process, and the parts storing the waste heat are reduced to decrease the reset time, thus increasing the efficiency of continuous toasting.

Furthermore, the present invention also brings forth the effects that since the operating and hook levers having to be independently operated are co-axially and collectively provided on the vertically movable device, there is no need to provide any movable parts for causing vertical movements and manual releasing operation in the lower portion of the unit, so that the space can be utilized for the provision of other functional means, such as the temperature control device, and that the movable mechanisms are collectively provided on the vertically movable device such that the overall construction is simple and the assembly and maintenance thereof are easy.

What is claimed is:

1. A toaster comprising a toaster body defining a bread toasting chamber, vertically movable means normally urged upwardly under the action of resilient means and connected to a bread supporter vertically movable within said bread toasting chamber, anchoring means for holding said vertically movable means in a bread toasting position, a bi-metal element for sensing the temperature of said bread toasting chamber, temperature control means for adjusting the position of said bi-metal element to achieve desired toasting of the bread and releasing means responsive to displacement of said bi-metal element to release the holding of the vertically movable means by the anchoring means; characterized in that said bi-metal element is secured to a bi-metal element supporting member pivotably mounted at its upper end on said toaster body, said bi-metal support member being connected to the bread supporter interlocked with the vertically movable means to vertically move within said bread toasting chamber, and said bread supporter being interlocked with said temperature control means to move in a horizontal direction upon movement of said temperature control means thereby pivoting said bi-metal element supporting member to displace said bi-metal element and adjust the toasting of the bread.

2. A toaster as set forth in claim 1 wherein said vertically movable means is vertically movable along a pair of guide rods positioned along a side plate of the toaster body and is also angularly movable about one of said guide rods to cause the movement of the other guide rod towards the bread supporter, the angularly movable side of said vertically movable means being connected to the bread supporter connected to said bi-metal element supporting member, and the angular position of said vertically movable means being defined by said temperature control means.

3. A toaster as set forth in claim 2 wherein said temperature control means is positioned below said vertically movable means and is slidable on said pair of guide rods perpendicular to the direction of movement of said bread supporter, and there is provided a control surface which abuts against a projection provided on said vertically movable means to define the angular position thereof when said vertically movable means is downwardly moved to the bread toasting position, and said control surface is inclined horizontally with respect to a line extending between said guide rods.

4. A toaster as set forth in claim 3 wherein said temperature control means is formed into a ]-shape having upper and lower walls formed with slots therein slidably engaged by said guide rods, and a spring means is interposed between said guide rods abutting said temperature control means to provide a predetermined load thereto.

5. A toaster as set forth in claim 2 wherein said resilient means is fixed at its one end to the toaster body and is secured at its other end to the angularly movable side of said vertically movable means, said resilient means normally urging said vertically movable means upwardly and also in a direction to cause the abutment of the projection of said vertically movable means with a control surface of said temperature control means.

6. A toaster as set forth in claim 2 wherein the bread supporter vertically movable within said bread toasting chamber is engaged at its opposite ends with guide slots formed in the side plates of the toaster body, and the guide slot engaged by the free end of the bread supporter is formed such that its upper portion has a width relatively larger than that of the bread supporter and its lower portion has a width slightly larger than that of the bread supporter.

7. A toaster as set forth in claim 1 wherein said bread supporter is provided with a connecting plate having a through hole in which is fitted said bi-metal element supporting member, and said connecting plate is provided with a slot through which a bolt extends to secure the connecting plate to said bread supporter.

8. A toaster as set forth in claim 1 wherein said bi-metal element supporting member is formed of a rod bent into an L-shape at its upper end portion, and an upper plate of the toaster body is bent to have upright walls at its opposite sides, and said upper end portion of said bi-metal elements supporting member is fitted in grooves formed in said upright walls, and said bi-metal element supporting member is mounted on the toaster body against upward movement by a tongue formed on said upper plate.

9. A toaster comprising a toaster body defining a bread toasting chamber, vertically movable means normally urged upwardly under the action of resilient means and connected to a bread supporter vertically movable within said bread toasting chamber, anchoring means for holding said vertically movable means in a bread toasting position, a bi-metal element for sensing the temperature of said bread toasting chamber, temperature control means for adjusting the position of said bi-metal element to achieve desired toasting of the bread and releasing means responsive to displacement of said bimetal to release the anchor of the vertically movable means by the anchoring means, wherein said vertically movable means connected to said bread supporter is provided with an operating lever pivotally mounted on said vertically movable means, and also with a hook lever provided co-axially with said operating lever to cause independent pivotal movement in the same direction as that of the latter, and said operating lever is provided at its one end with a latch which is engageable with an anchor provided on a lower end portion of said hook lever, and a spring is interposed between said operating and hook levers to normally act to engage said anchor with said latch thereby pivotally moving the hook lever together with the operating lever, and a hook receiving member engageble with the hook lever is provided on the side place of the toaster body adjacent to said hook lever when the vertically movable means is downwardly moved to the bread toasting position, and a distorting plate is provided adjacent to said hook receiving member which distorts to disengage the hook lever from the hook receiving member upon the completion of toasting of the bread.

10. A toaster as set forth in claim 9 wherein said hook lever is provided with an arcuate oblique surface which is slidably engageable with an arcuate oblique surface formed on the hook receiving member, and said hook lever is further provided with an anchor positioned above said oblique surface to engage with a step portion formed on the hook receiving member.

* * * * *